United States Patent [19]
Burga et al.

[11] Patent Number: 6,138,502
[45] Date of Patent: Oct. 31, 2000

[54] GLIDE HEAD FOR DETECTING DEFECTS ON A DISK SURFACE

[75] Inventors: Alexander Burga, San Jose; Margelus Burga, Santa Clara, both of Calif.

[73] Assignee: Marburg Technology, Inc., Milpitas, Calif.

[21] Appl. No.: 09/092,561

[22] Filed: Jun. 5, 1998

[51] Int. Cl.[7] .............................. G01B 5/28; G01B 7/34; G01B 17/08
[52] U.S. Cl. ............................................................. 73/105
[58] Field of Search ................................................. 73/105

[56] References Cited

U.S. PATENT DOCUMENTS

| | | | |
|---|---|---|---|
| 5,537,863 | 7/1996 | Fujiu et al. | 73/105 |
| 5,689,064 | 11/1997 | Kennedy et al. | 73/105 |
| 5,723,775 | 3/1998 | Watanabe et al. | 73/105 |
| 5,939,623 | 8/1999 | Muramatsu et al. | 73/105 |
| 5,939,624 | 8/1999 | Smith, Jr. | 73/105 |
| 6,000,282 | 12/1999 | Ku et al. | 73/105 |
| 6,003,364 | 12/1999 | Yao et al. | 73/105 |
| 6,016,692 | 1/2000 | Schaenzer et al. | 73/105 |
| 6,023,963 | 2/2000 | Schaenzer et al. | 73/105 |

OTHER PUBLICATIONS

Wallash, A. "Reproduction of Slider Vibrations During Head/Disk Interactions Using PZT Sensors", IEEE Transactions on Magnetics, vol. 24, No. 6, Nov. 1988, pp. 2763–2765.

"Guide to Modern Piezoelectrc Ceramics", Morgan Matroc, Inc., Electro Ceramics Division, pp. 1–27.

Van Vlack, "A Textbook of Materials Technology", Addison–Wesley Publishing Co., 1973, pp. 234–238.

*Primary Examiner*—Daniel S. Larkin
*Attorney, Agent, or Firm*—Skjerven Morrill MacPherson LLP; Michael J. Halbert

[57] ABSTRACT

A glide head for testing the surface of a magnetic disk includes a slider, a type 2 piezo-electric transducer mounted on the slider, and a type 1 piezo-electric transducer mounted on the type 2 piezo-electric transducer. The piezo-electric transducers are mechanically coupled to one another but not electrically coupled to one another. The electrical voltage provided by the type 2 piezo-electric transducer is more sensitive to magnetic disk surface defects than if the type 1 piezo-electric transducer were not present.

20 Claims, 10 Drawing Sheets

GLIDE HEAD FOR DETECTING DEFECTS ON A DISK SURFACE

BACKGROUND OF THE INVENTION

This invention relates to glide heads for detecting defects on a disk surface.

Typical magnetic disks comprise an Al substrate, a NiP layer which is plated on the Al, polished and then textured, an underlayer (e.g. Cr or NiP) sputtered on the plated NiP layer, a thin film of magnetic recording material (typically a Co alloy) sputtered on the underlayer, a protective overcoat sputtered on the magnetic film, and a lubrication layer formed on the overcoat. Magnetic disk manufacturing specifications typically require that asperities and depressions on a magnetic disk are smaller than a certain size. Although magnetic disks are typically textured to have a specified roughness, there has been a trend in the industry to make magnetic disks smoother and smoother. Presently, some magnetic disks are specified to have a roughness less than or equal to about 30 Å (3 nm). As the specified roughness is decreased, the size of the asperity or depression that can be tolerated is decreased.

Media certifiers are apparatus for ensuring that the asperities and depressions on a magnetic disk are less than a specified size. Glide heads are used in conjunction with media certifiers to detect the asperities and depressions. Referring to FIG. 1, during use, a disk 10 is rotated in a direction A1, thereby creating an air cushion above the disk. A glide head 12 includes a slider 13 which rests on this air cushion. A piezo-electric transducer 14 is mounted on slider 13. If slider 13 collides with a defect on rotating disk 10, e.g. an asperity 16, the mechanical shock from the collision with asperity 16 causes transducer 14 to create an electrical voltage. Transducer 14 is connected, via wires, to a circuit within the media certifier (not shown). This circuit identifies signals caused by collisions between slider 13 and asperities. The larger the asperity, the larger the electrical voltage created by transducer 14 and sensed by the circuit within the certifier.

There are two types of piezo-electric transducers used in conjunction with prior art glide heads:

a) A "type 1," or "bimorph" transducer, which creates an electrical voltage when the piezo-electric material is bent.

b) A "type 2," or "compression" piezoelectric transducer, which creates an output voltage in response to acoustic waves (or externally applied stresses).

A type 1 transducer provides a stronger output voltage in response to low frequency stresses (e.g. less than or equal to about 100 KHz). A type 2 transducer provides a stronger output at higher frequencies (e.g. as high as 700 KHz). Type 2 transducers are more commonly used in glide heads than type 1 transducers.

Piezo-electric transducers are discussed in "Guide to Modern Piezoelectric Ceramics", published by Morgan Matroc, Inc., Electro Ceramics Division, incorporated herein by reference. Also see Van Vlack, "A Textbook of Materials Technology", published by Addison-Wesley Publishing Co., 1973, pp. 234–238, incorporated herein by reference. As explained in "Guide to Piezoelectric Ceramics," bimorph piezo-electric transducers comprise two layers of piezo-electric material 17, 18 that are bonded together, e.g. as shown in FIG. 2. The bimorph piezo-electric transducer produces an output voltage when it is bent as shown in FIG. 2.

During use, glide head 12 vibrates even when it does not strike a defect. This causes transducer 14 to produce an output voltage noise signal. With use, head 12 tends to become less sensitive to asperities due to wear of slider 13. Thus, the signal to noise ratio ("SNR") tends to decrease with use. Accordingly, it would be desirable to increase the SNR provided by transducer 14.

SUMMARY

A glide head in accordance with our invention includes a type 1 piezo-electric transducer mounted on a type 2 piezo-electric transducer. These transducers are mounted on a glide head slider. The type 1 and type 2 transducers are mechanically but not electrically coupled to each other. The type 2 transducer generates an electrical signal which is used by a media certifier to detect disk surface defects, such as asperities and depressions. We have discovered that the presence of a type 1 transducer mechanically coupled to the type 2 transducer causes the glide head to provide a signal having an improved SNR, even if the type 1 and 2 transducers are not electrically connected to each other. We believe that the type 1 piezo-electric transducer exerts a mechanical force on the type 2 transducer when the glide head collides with a defect. This force effectively amplifies the mechanical stimulus to the type 2 transducer during the collision. The reason for this is described below.

In accordance with another embodiment of our invention, a slider includes a first type 2 piezo-electric transducer mounted on a glide head and a second type 2 piezo-electric transducer mounted on the first type 2 transducer (but not electrically connected to the first type 2 transducer). The second type 2 transducer is typically oriented in a direction perpendicular to the first type 2 transducer. We have discovered that mounting the second type 2 transducer in this way enhances the SNR of the first type 2 transducer. We believe that the second type 2 piezo-electric transducer exerts a mechanical force on the first type 2 transducer when the glide head collides with a defect. This mechanical force effectively amplifies the mechanical stimulus to the first type 2 transducer during the collision.

In accordance with another embodiment of our invention, a type 2 piezoelectric transducer is mounted on a slider and a beam of non-piezo-electric material is mounted on the transducer. The beam mechanically interacts with the piezo-electric transducer to enhance the SNR of the transducer. The beam vibrates in a manner dependent upon the beam's elastic properties. The vibration of the beam exerts a mechanical force on the type 2 piezo-electric transducer, enhancing the transducer response at or near th e beam vibration frequency.

DETAILED DESCRIPTION

Figure 1:
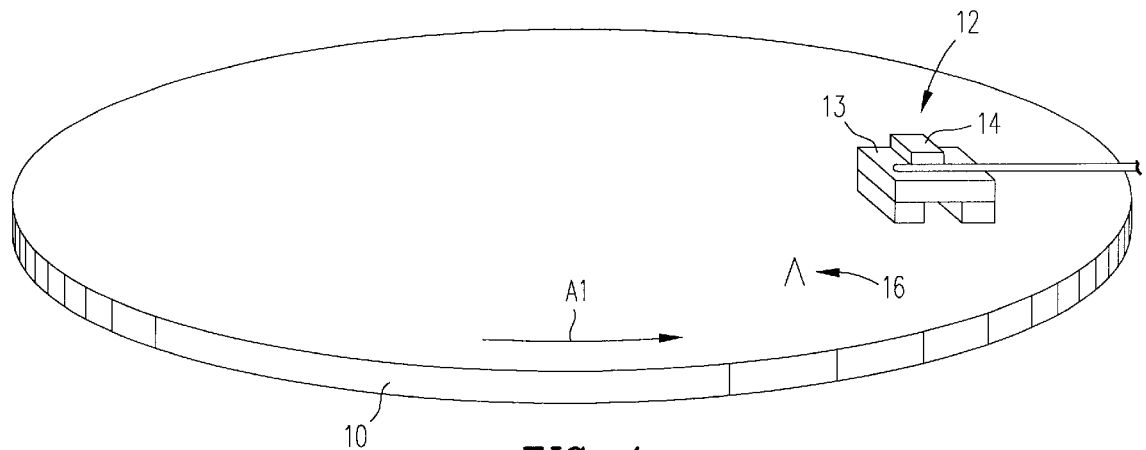
FIG. 1 schematically illustrates a glide head for detecting an asperity on a magnetic disk in accordance with the prior art.
Figure 2:
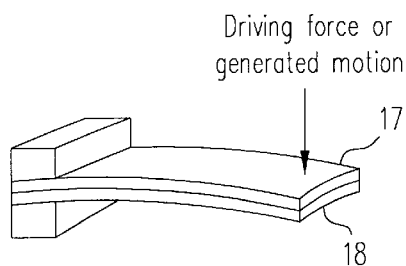
FIG. 2 illustrates a bimorph piezo-electric transducer.
Figure 3:
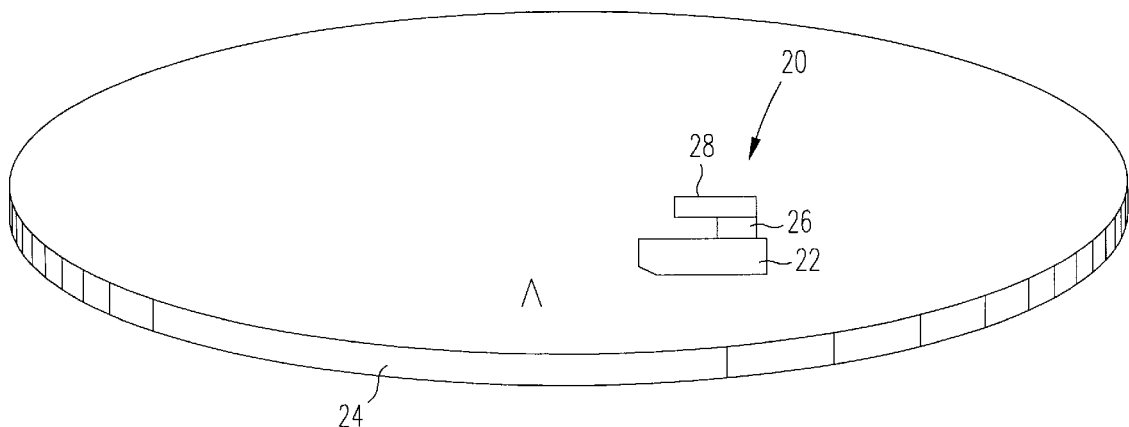
FIG. 3 illustrates a glide head including a type 1 piezo-electric transducer mounted on a type 2 piezo-electric transducer.

Referring to FIG. 3, a glide head 20 in accordance with our invention includes a slider 22 for flying over the surface of a rotating magnetic disk 24. A type 2 piezo-electric transducer 26 is affixed to slider 22, e.g. with epoxy, and a type 1 piezo-electric transducer 28 is affixed to transducer 26, e.g. also with epoxy. In one embodiment, the epoxy is type No. 409, manufactured by Loctite Corporation, located in Rocky Hill, Conn. However, in other embodiments, other means are used to affix the transducers to each other and to slider 22. Also, in one embodiment, a spacer layer such as glass is provided between transducers 26 and 28.

Figure 3A:
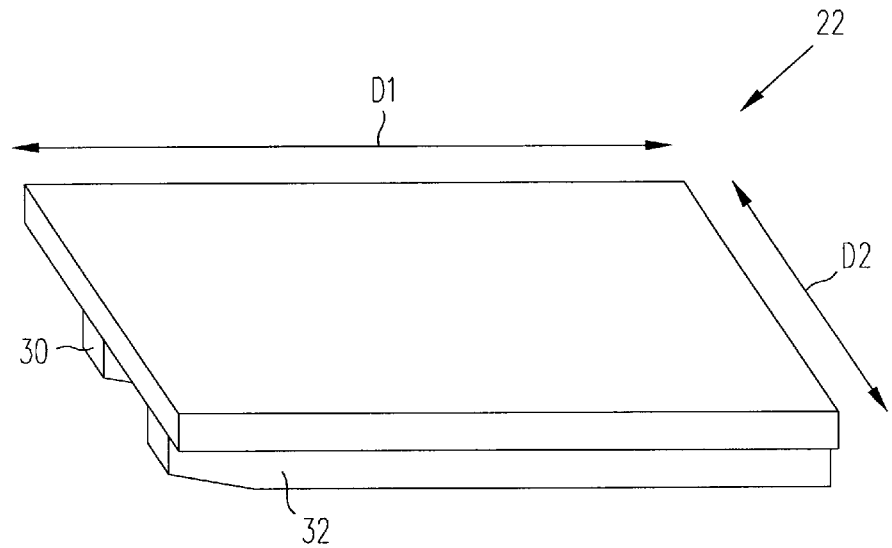
FIG. 3A is a perspective view of a slider within the glide head of FIG. 3.
Figure 3B:
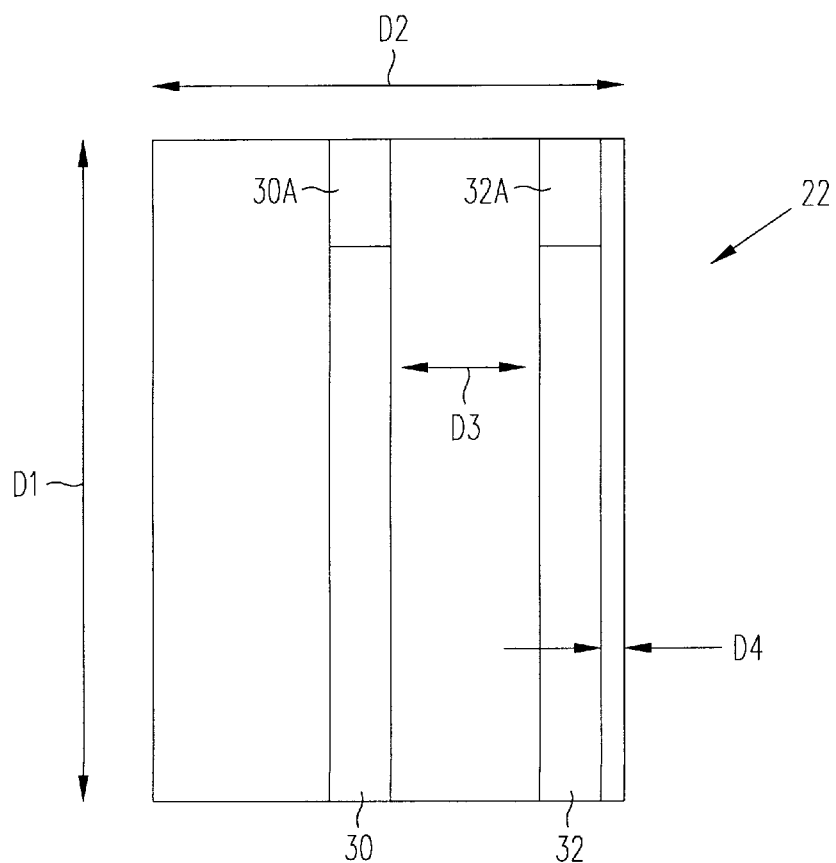
FIG. 3B is a bottom plan view of the slider of FIGS. 3 and 3A.

Slider 22 is typically a conventional slider made from a suitable material such as $Al_2O_3$—TiC. FIGS. 3A and 3B are perspective and bottom plan views of slider 22, respectively. Slider 22 includes a pair of rails 30, 32 which serve as an air bearing surface. Slider 22 typically has a length D1 of 78 mils and a width D2 of 98 mils. The distance D3 between rails 30 and 32 is typically about 59 mils. Rail 30 is typically a distance D4 of about 2 mils from an edge 34 of slider 22. Rails 30, 32 include leading edge ramp 30a, 32a, for aerodynamic purposes, as is typical in sliders. It should be emphasized, however, that the dimensions, shape and material of slider 22 are not a critical part of our invention, and other sizes, shapes, and materials can be used.

Figure 3C:
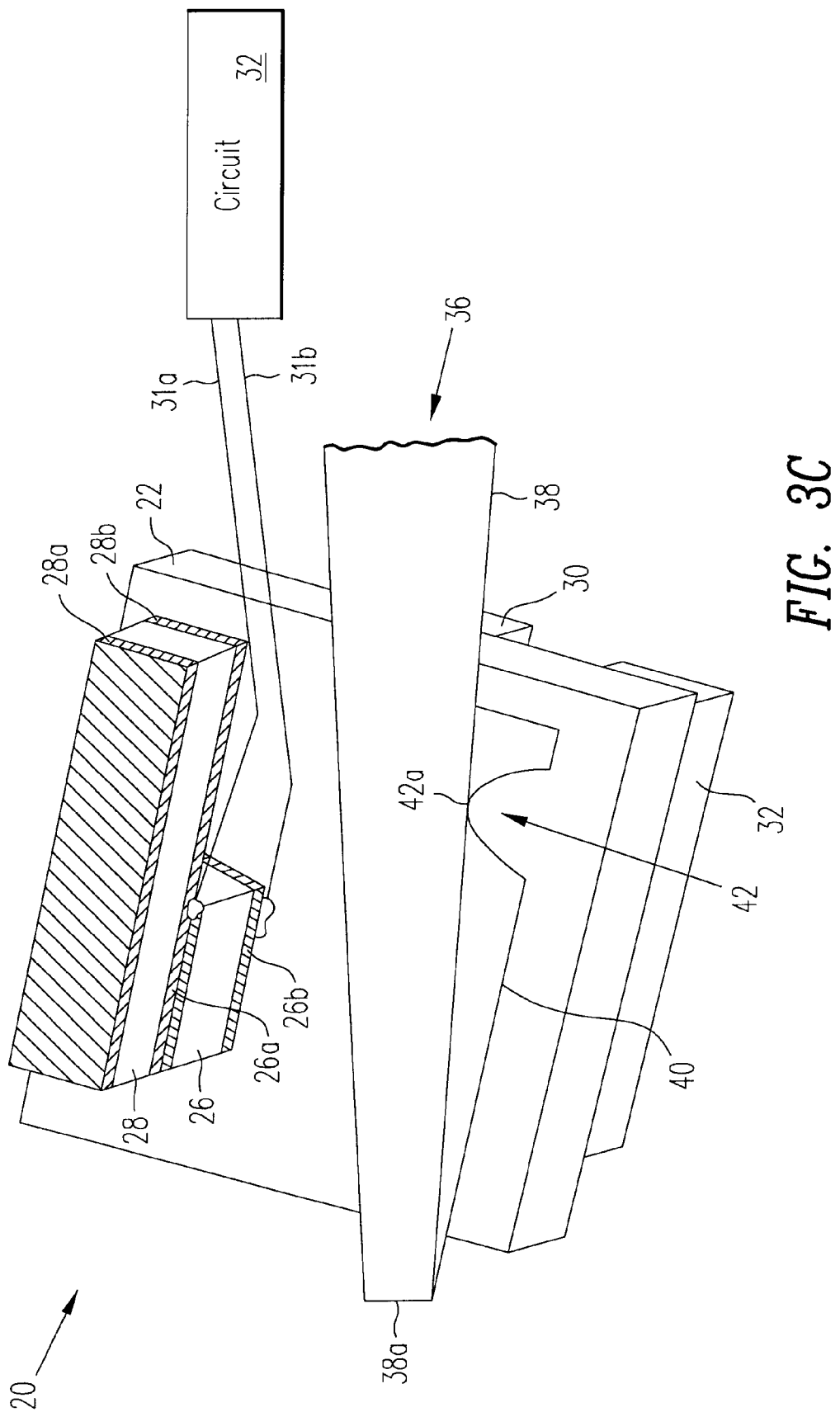
FIG. 3C is a perspective view of the slider, piezo-electric transducers and mounting arm shown in FIGS. 3, 3A, and 3B.

Transducer 26 is typically shaped like a rectangular prism that is 20 mils wide, by 35 mils long, by 30 mils thick. However, other shapes and sizes can also be used. For example, transducer 26 can be between 10 and 30 mils thick. In one embodiment, transducer 26 is a lead zirconate titanate ceramic ("PZT"). However, other materials exhibit piezo-electric properties, e.g. materials having an asymmetric crystal lattice such as lithium niobate, $BaTiO_3$, $PbZrO_3$, $PbTiO_3$, and other ferroelectric materials. Transducer 26 can be model number PZ29, available from Seacor Piezo Ceramics, located in Branford, Conn. As shown in FIG. 3C, electrodes 26a, 26b (typically made of silver) are formed opposite sides of transducer 26, and electrical wires 31a, 31b are provided for electrically connecting electrodes 26a, 26b to an electronic circuit schematically shown as block 32 within the media certifier. In one embodiment, the certifier can be device model No. MSA950, available from Cambrian (Phase Metrics) Corporation located in California. However, other types of certifiers can be used as well.

Transducer 28 is typically shaped like a rectangular prism that is 40 mils long, by 90 mils wide, by 20 mils thick. Transducer 28 can be made of PZT or other materials. Also, other sizes and shapes can be used. Transducer 28 is typically provided by the manufacturer with silver electrodes 28a, 28b. However, electrodes 28a and 28b are not typically electrically contacted in this embodiment. There is no electrical contact between transducers 26 and 28.

The top surface of slider 22 is mounted to a suspension arm 36. Arm 36 can be a conventional suspension arm, such as type 2, 4, 13, 18.50, or 19 manufactured by Magnecom, Inc., located in San Diego, Calif. Arm 36 includes a first metal member 38 which terminates at an end 38a. A second metal member 40 is affixed to member 38 at end 38a. A dimple 42 is formed in member 40, and a top surface 42a of dimple 42 is welded to member 38.

In one embodiment, slider 22 is affixed by epoxy to second metal member 40. Also, in one embodiment, arm 36 is made of aluminum.

Figure 4A:
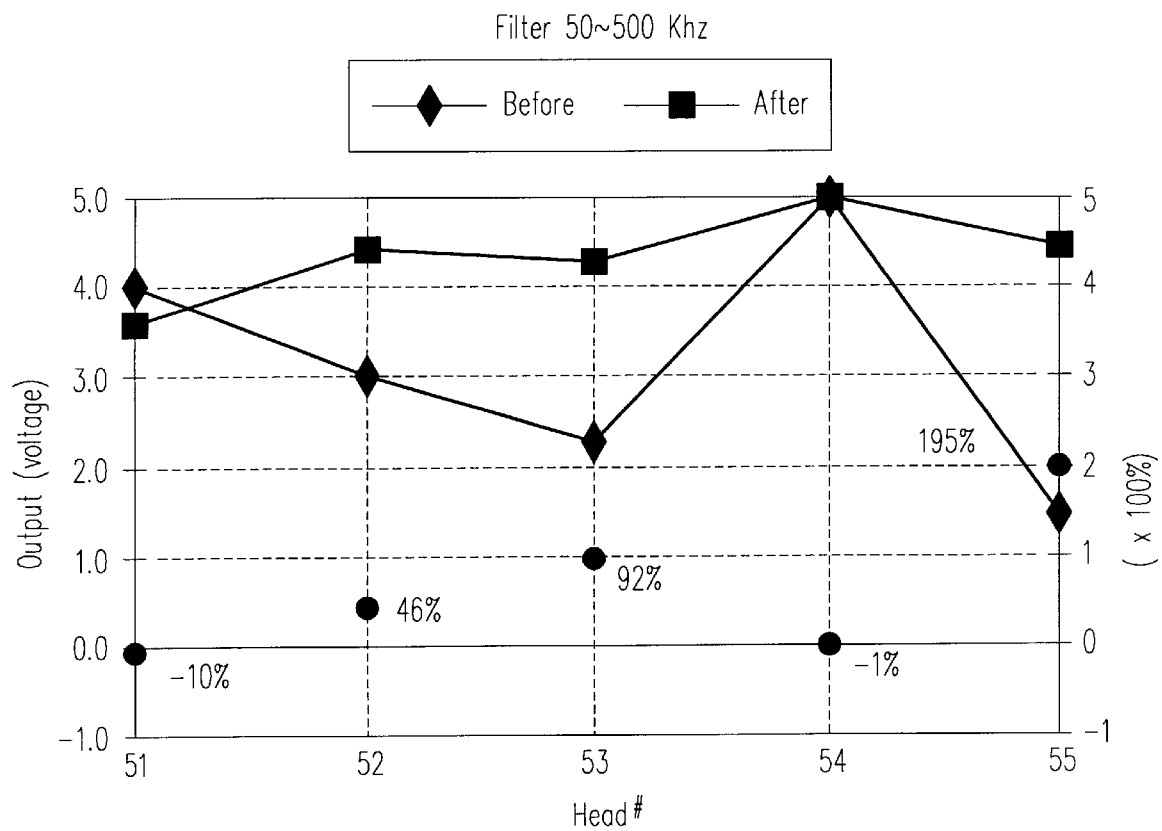
FIG. 4A illustrates the low frequency component (provided by a 50 to 500 KHz pass filter) of the voltage provided by a type 2 transducer mounted on a glide head in accordance with our invention when the glide head strikes an asperity.
Figure 4B:
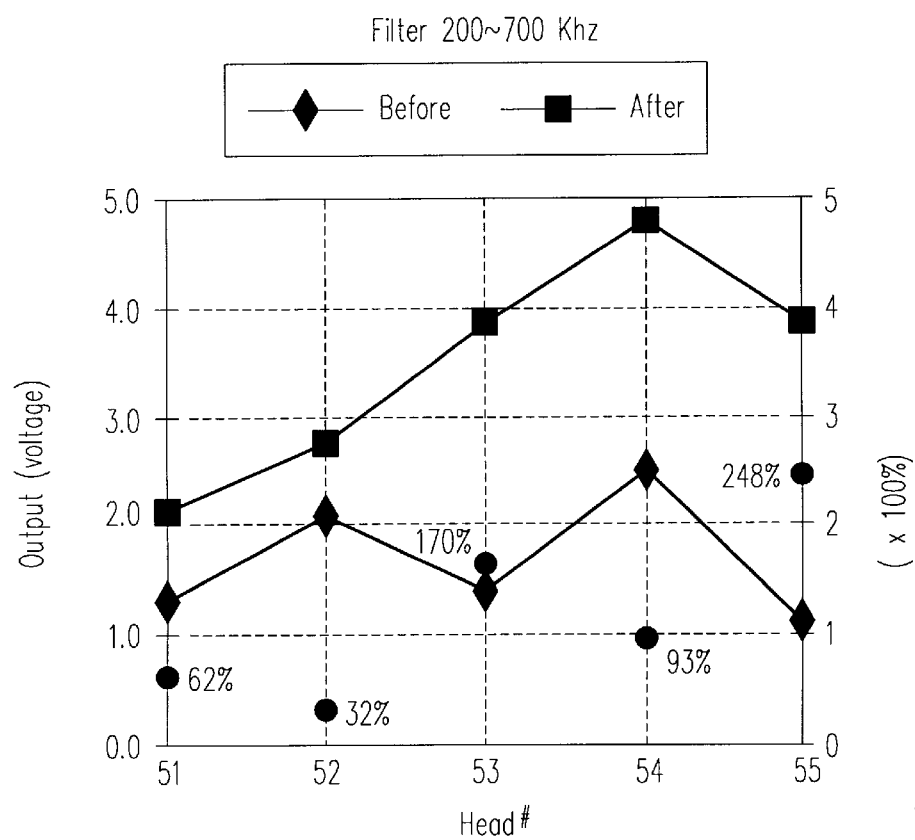
FIG. 4B illustrates the high frequency component (provided by a 200 to 700 KHz pass filter) of the voltage provided by the type 2 transducer of FIG. 4A when the glide head strikes an asperity.

FIGS. 4 and 5 show the increase in glide head sensitivity caused by mechanically coupling transducers 26 and 28. FIG. 4A and 4B show the signal produced by five glide heads 51, 52, 53, 54, and 55 when they hit a calibration asperity on a magnetic disk. (A calibration asperity is an asperity of a known size on a disk that is used to calibrate media certifiers.) In FIG. 4A, the output signal from transducer 26 was passed through an electrical filter which passes signals between 50 KHz and 500 KHz. The diamond graph points illustrate the output signal before second transducer 28 is mounted on the glide head. The square graph points illustrate the output signal after second transducer 28 is mounted on the glide head. As can be seen, glide heads 52, 53, and 55 show a marked improvement in sensitivity when second transducer 28 is affixed to first transducer 26 for low frequency component signals. Glide heads 51 and 54 show little if any change in sensitivity.

FIG. 4B also shows the signal produced by glide heads 51 to 55 when they hit the calibration asperity. However, the signals of FIG. 4B were passed through an electrical filter which passes signals between 200 KHz and 700 KHz. As can be seen, each of heads 51 to 55 showed a dramatic sensitivity improvement when second transducer 28 was affixed to first transducer 26. Head 52 showed the least amount of improvement (32%), while head 54 showed the greatest amount of improvement (248%). These differences are extremely important. Noise tends to be at lower frequencies. Accordingly, increasing the sensitivity of the transducer at higher frequencies (away from the major noise components) is a significant improvement to the glide head. The improvement in the glide head performance by mounting second transducer 28 to the glide head is summarized in Table 1 below.

TABLE I

| Head | Low Frequency Improvement | High Frequency Improvement |
|---|---|---|
| 51 | −10% | 62% |
| 52 | 46% | 62% |
| 53 | 92% | 170% |
| 54 | −1% | 93% |
| 55 | 200% | 248% |

Transducer 26 in FIGS. 4A and 4B was 35 mils long by 20 mils wide by 30 mils thick. Transducer 28 was 40 mils long by 90 mils wide by 20 mils thick.

Figure 5A:
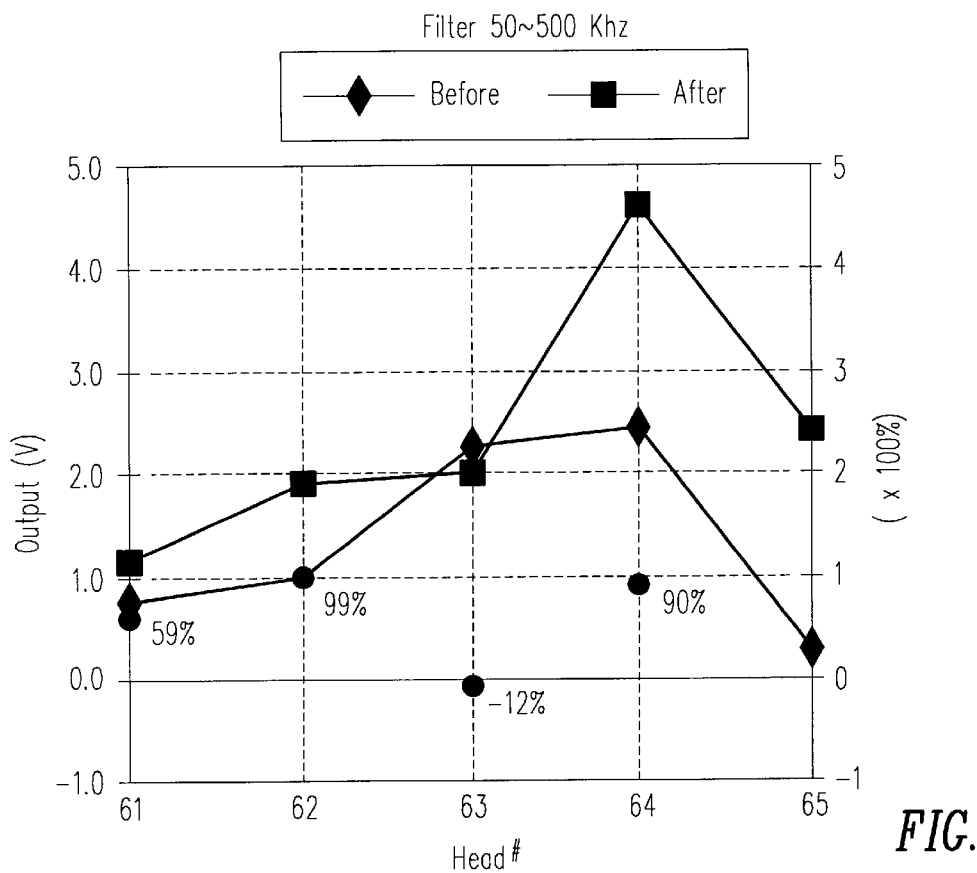
FIG. 5A illustrates the low frequency component (provided by a 50 to 500 KHz pass filter) of the voltage provided by a type 2 transducer mounted on a glide head in accordance with another embodiment of our invention.
Figure 5B:
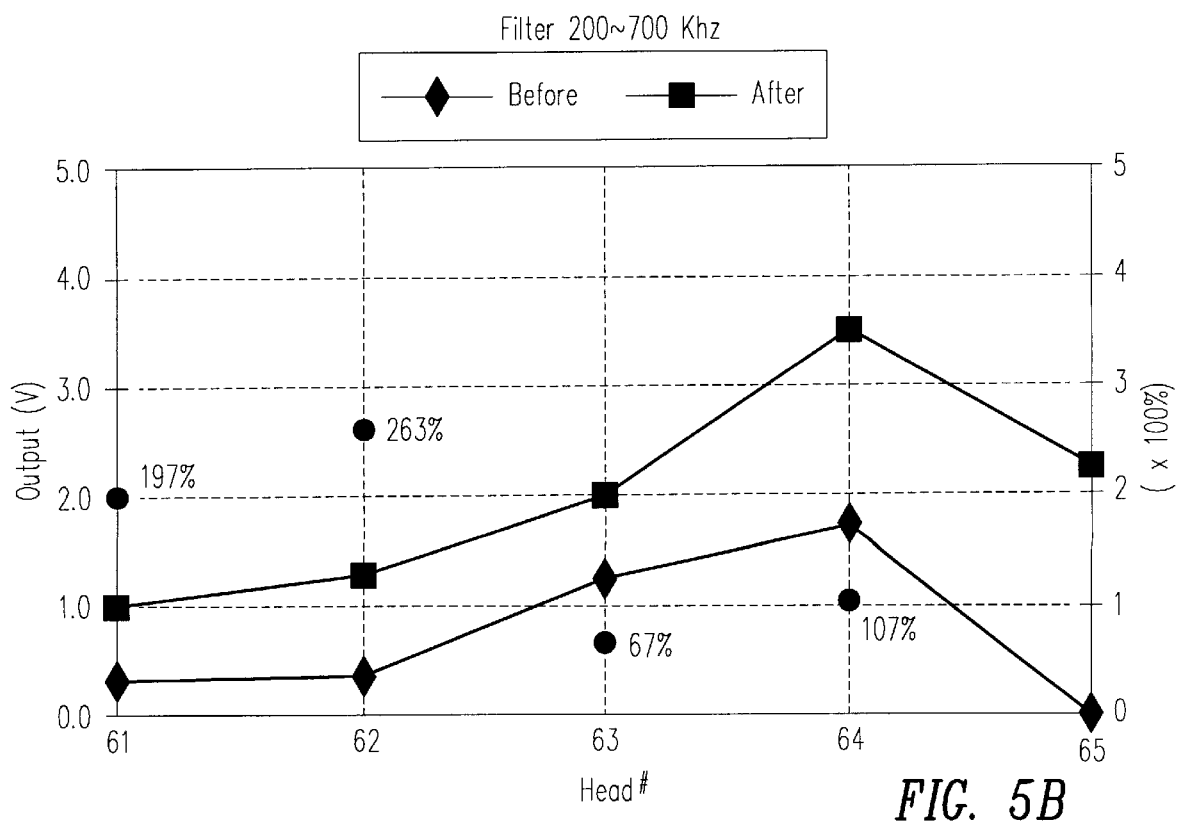
FIG. 5B illustrates the high frequency component (provided by a 200 to 700 KHz pass filter) of the voltage provided by the type 2 transducer of FIG. 5A when the glide head strikes an asperity.

The data of FIGS. 5A and 5B were gathered in a manner similar to that of FIGS. 4A and 4B, except that transducer 26 for heads 61 to 65 was 35 mils long by 20 mils wide by 30 mils thick, and transducer 28 was 30 mils long by 120 mils wide by 20 mils thick. FIGS. 5A and 5B show sensitivity improvements for heads 61 to 65 as set forth in Table II below for signals passed through the low pass filter (50 KHz to 500 KHz) and the high pass filter (200 KHz to 700 KHz), respectively. As can be seen, the improvement, especially for the high frequency signals, is excellent.

TABLE II

| Head | Low Frequency Improvement | High Frequency Improvement |
|---|---|---|
| 61 | 59% | 197% |
| 62 | 99% | 263% |
| 63 | −12% | 67% |
| 64 | 600% | 107% |
| 65 | 90% | 220% |

Although FIG. 3C shows transducer 26 mounted on slider 22 and transducer 28 mounted on transducer 26, in other embodiments, transducer 28 can be mounted on slider 22 and transducer 26 can be mounted on transducer 28. Also, instead of mounting the transducers directly on slider 22 and on each other, transducer 26 can be mounted on an intermediate structure which in turn is affixed to slider 22, and transducer 28 can be mounted on an intermediate structure which in turn is affixed to transducer 26.

Also, transducers 26 and 28 can be mounted on arm 36 instead of slider 22. It should also be noted that although FIG. 3C shows transducer 26 mounted on a certain position on slider 22, the exact position at which transducer 26 is mounted is not critical to our invention.

Figure 6:
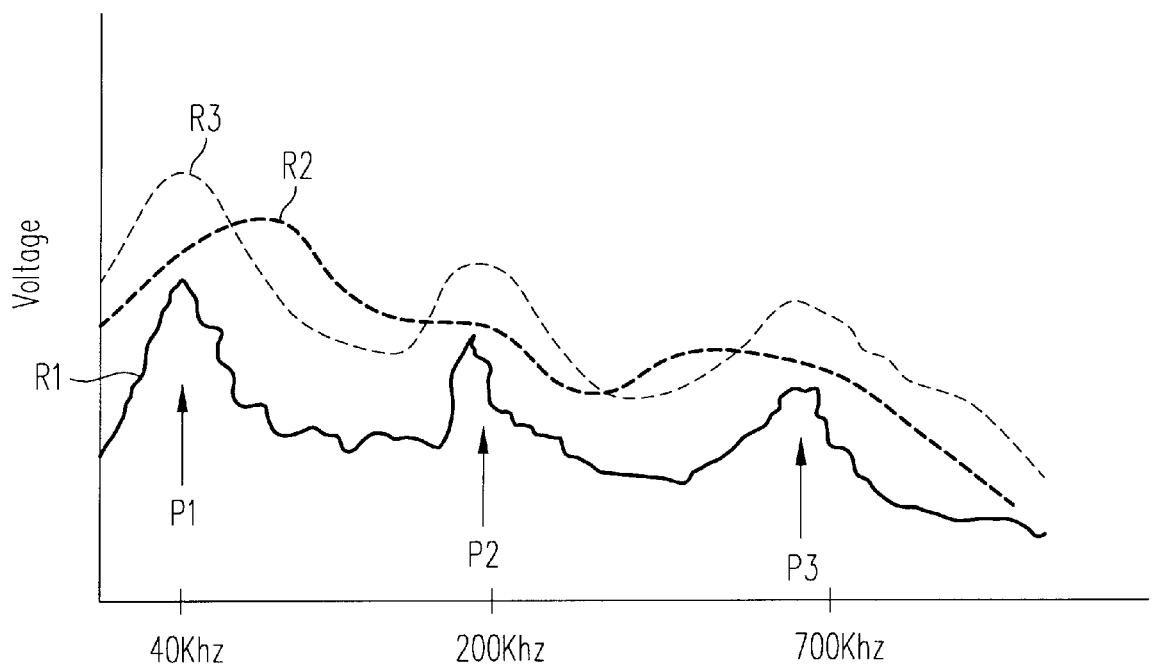
FIG. 6 illustrates the output voltage vs. frequency for a mechanical stimulus applied to a type 1 piezo-electric transducer.

To understand why we achieve improved results with our invention, reference is made to FIG. 6, which shows the voltage v. frequency response R1 of a type 2 piezo-electric crystal caused by a mechanical stimulus of a given magnitude. The Y axis is the voltage provided by the transducer and the X axis is the frequency of the stimulus. As can be seen, the piezo-electric crystal provides high voltage responses at peaks P1, P2, and P3.

The reason for peaks P1 to P3 is that piezo-electric transducers, like all materials, exhibit a certain amount of elasticity and possess mass. A mechanical system exhibiting elasticity and mass tends to resonate at certain "natural frequencies". Peaks P1 to P3 represent mechanical stimuli at or near the natural resonant frequency of the piezo-electric material. The transducer is more sensitive to stimuli at these frequencies although the natural resonant frequencies of the transducer are usually higher then the stimulus normally applied to the transducer during use.

Figure 7:
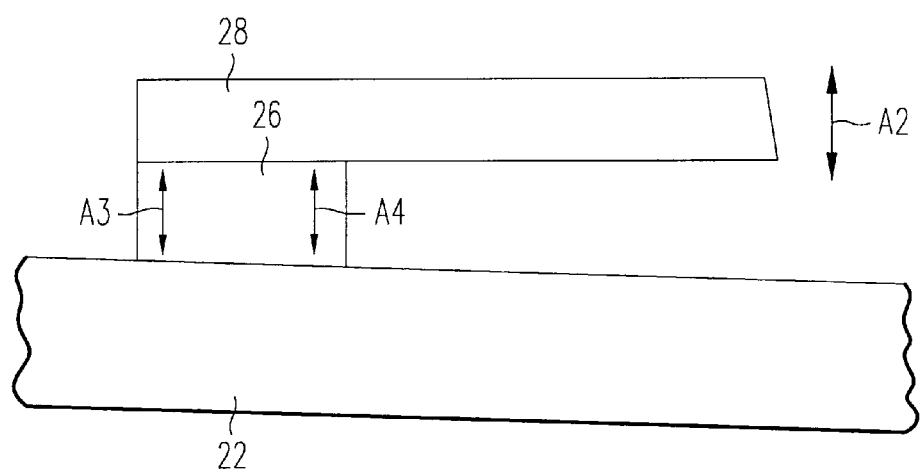
FIG. 7 illustrates the forces exerted on a type 2 transducer by a type 1 piezo-electric transducer.

Transducer 28 is in the shape of a cantilever. Transducer 28 also has a natural resonant frequency. Thus, when slider 22 strikes an asperity, transducer 28 vibrates, e.g. as shown by arrow A2 (FIG. 7). The natural oscillation frequency of transducer 28 is a function of the length, width, thickness, density, and elasticity of transducer 28. When transducer 28 vibrates, it applies mechanical forces on transducer 26 as shown by arrows A3 and A4, which in turn cause transducer 26 to provide an output voltage. (The force applied on transducer 26 by transducer 28 is at the resonant frequency of vibration of transducer 28.) In effect, transducer 28 acts as a mechanical amplifier of the vibrations induced when slider 22 strikes an asperity. In one embodiment, the circuitry coupled to transducer 26 is designed to be sensitive to signals at the natural frequency of oscillation of transducer 28. As shown in FIG. 6, the response curve of voltage vs. frequency when transducer 28 is present is altered (see response curve R2), but not necessarily in a manner which mirrors peaks P1, P2, P3 of curve R1.

Figure 8:
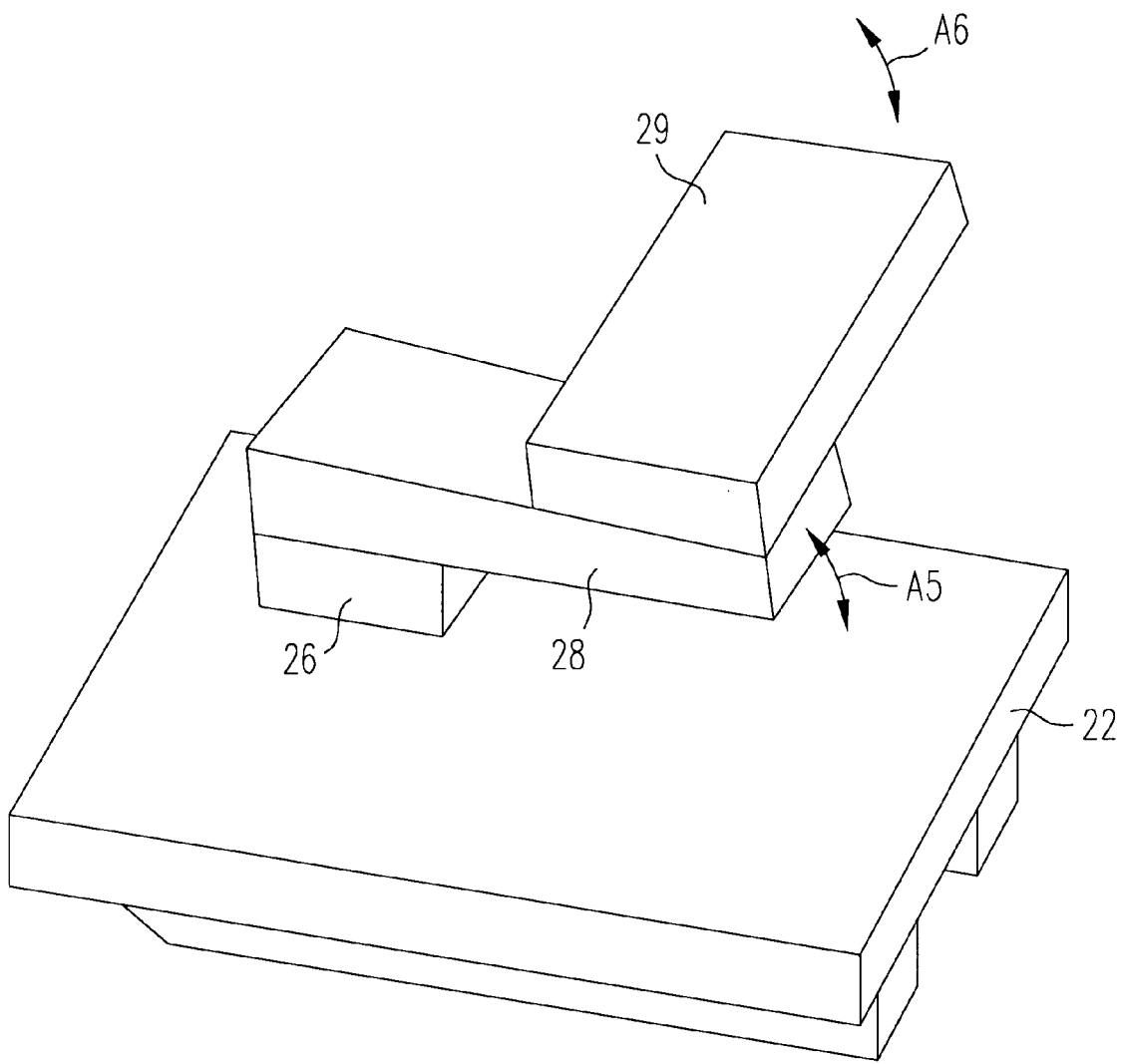
FIG. 8 illustrates an embodiment of our invention comprising two type 1 piezo-electric transducers mounted on a type 2 piezo-electric transducer.

FIG. 8 illustrates an embodiment of our invention comprising a type 2 transducer 26, a first type 1 transducer 28 and a second type 2 transducer 29. When slider 22 strikes an asperity, transducer 28 vibrates as shown by arrow A5, which causes transducer 29 to vibrate as shown by arrow A6. This serves to apply additional vibrational forces on transducer 26 to thereby enhance the output signal of transducer 26.

Figure 9:
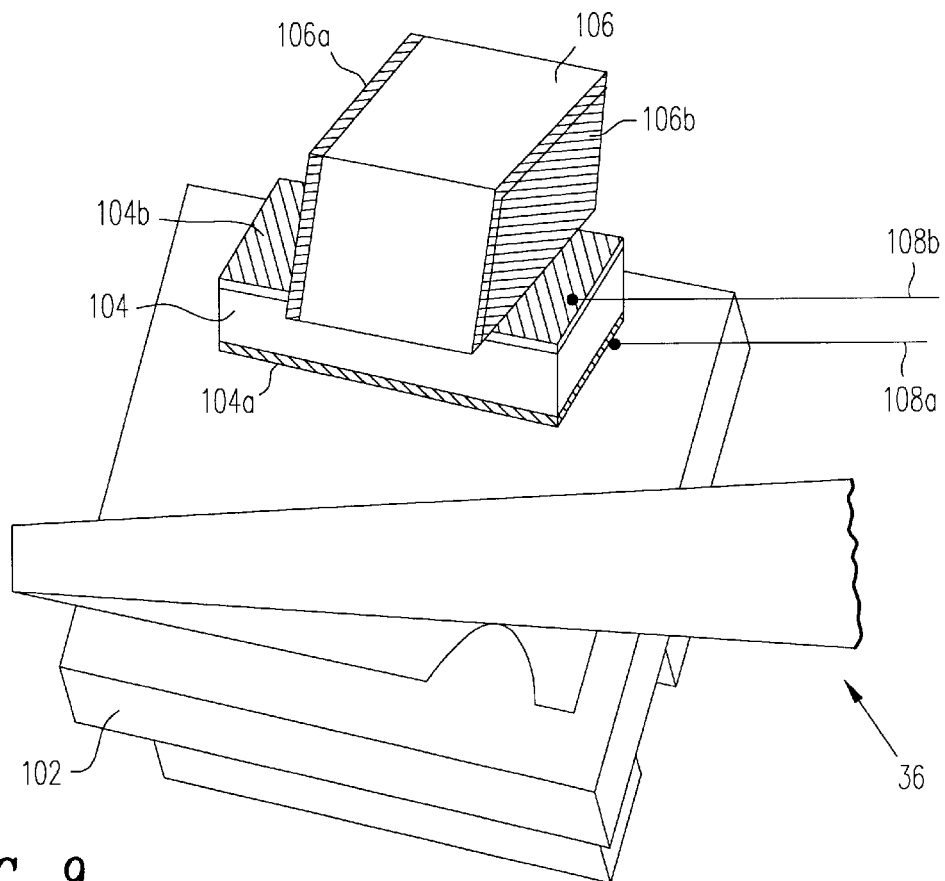
FIG. 9 illustrates a first type 2 piezo-electric transducer mounted on a glide head and a second type 2 piezo-electric transducer mounted on the first type 2 transducer.

FIG. 9 illustrates a glide head 100 in accordance with another embodiment of our invention including a slider 102, a first type 2 piezo-electric transducer 104 mounted on slider 102, and a second type 2 piezo-electric transducer 106 mounted on transducer 104, but oriented in a direction substantially perpendicular to transducer 104. If transducers 104 and 106 are not oriented in mutually perpendicular orientations, optimal improvement in SNR is not achieved. Silver electrode 104a, 104b are formed on transducer 104, and wires 108a, 108b are connected to electrodes 104a, 104b, respectively.

Transducer 106 typically includes silver electrodes 106a, 106b provided by the manufacturer, but electrodes 106a, 106b are not electrically connected to anything. We have discovered that head 100 including two type 2 transducers provides a SNR that is superior to the SNR of a slider having only one type 2 transducer. Surprisingly, this effect is achieved although the two type 2 transducers are not electrically connected to one another.

Figure 10:
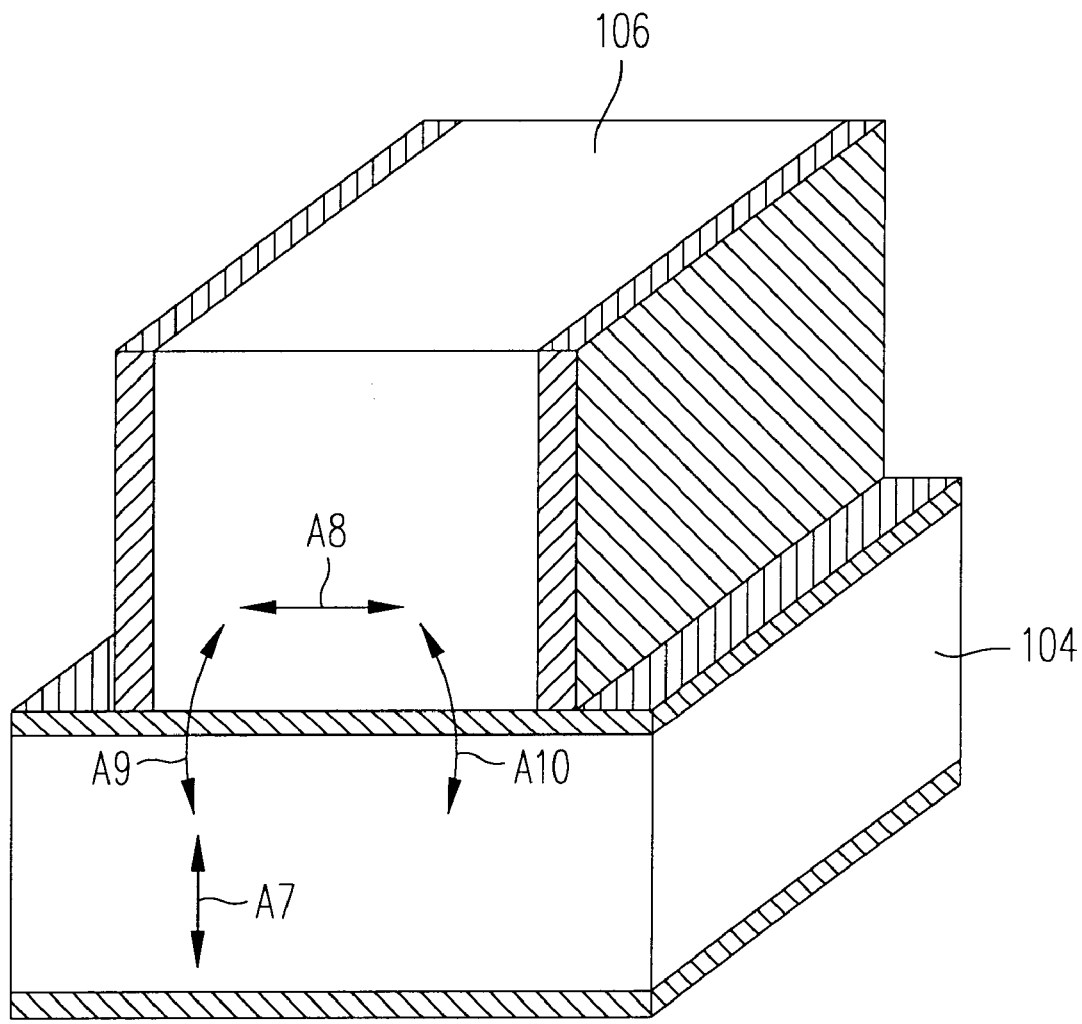
FIG. 10 schematically illustrates the manner in which two type 2 piezo-electric transducers interact in the embodiment of FIG. 9.

We believe that the output signal of transducer 104 is enhanced for the following reason. Transducer 104 tends to vibrate preferentially in a direction A7, and transducer 106 tends to vibrate preferentially in a direction A8 (See FIG. 10). Vibration by transducer 106 exerts an additional mechanical force represented by arrows A9 and A10. We believe that transducer 106 applies a force at or near the natural resonant frequency of transducer 104, which thereby amplifies the vibration of transducer 104.

In a mechanical system characterized by a natural frequency of oscillation, applying a sinusoidally varying force on the system with a frequency at or near the natural frequency of oscillation tends to amplify the oscillation. We believe that this is the effect that transducer 106 has on transducer 104. Specifically, transducers 104 and 106 tend to oscillate with a natural resonant frequency ωo. The oscillation of transducer 106 applies a force to transducer 104 at a frequency close to ωo which amplifies the oscillation of transducer 104. The peaks in the voltage vs. frequency response curve of transducer 104 with transducer 106 present (see curve R3 of FIG. 6) typically mirror the peaks P1, P2, P3 in curve R1 when transducer 106 is not present.

Figure 11:
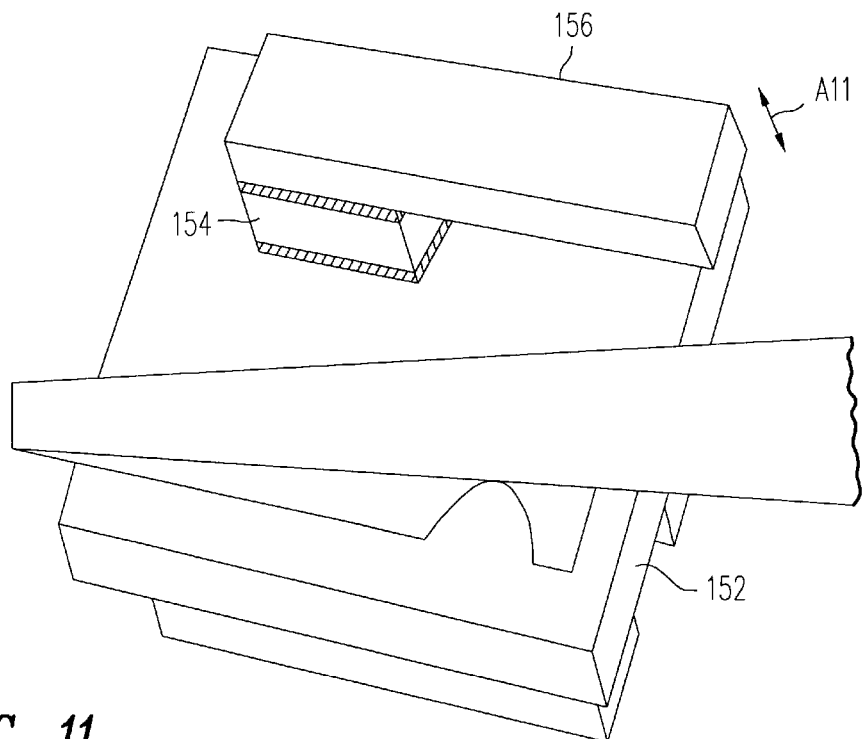
FIG. 11 illustrates a type 2 piezo-electric transducer mounted on a glide head and a block of $Al_2O_3$—TiC mounted on the type 2 transducer.

FIG. 11 illustrates a glide head 150 comprising a slider 152, a type 2 piezo-electric transducer 154, and a block 156 formed thereon. In the embodiment of FIG. 11, block 156 is a ceramic material such as $Al_2O_3$—TiC, but block 156 can be other materials as well. When slider 152 strikes an asperity, transducer 154 and block 156 mechanically interact to enhance the SNR of the signal provided by transducer 154. Block 156 mechanically interacts with transducer 154 in a manner similar to the manner in which transducer 28 interacts with transducer 26 (see FIG. 7). Specifically, when slider 152 strikes an asperity, block 156 vibrates as indicated by arrow A11, thereby exerting a mechanical force on transducer 154, to thereby causes transducer 154 to provide an increased output voltage.

Figure 12:
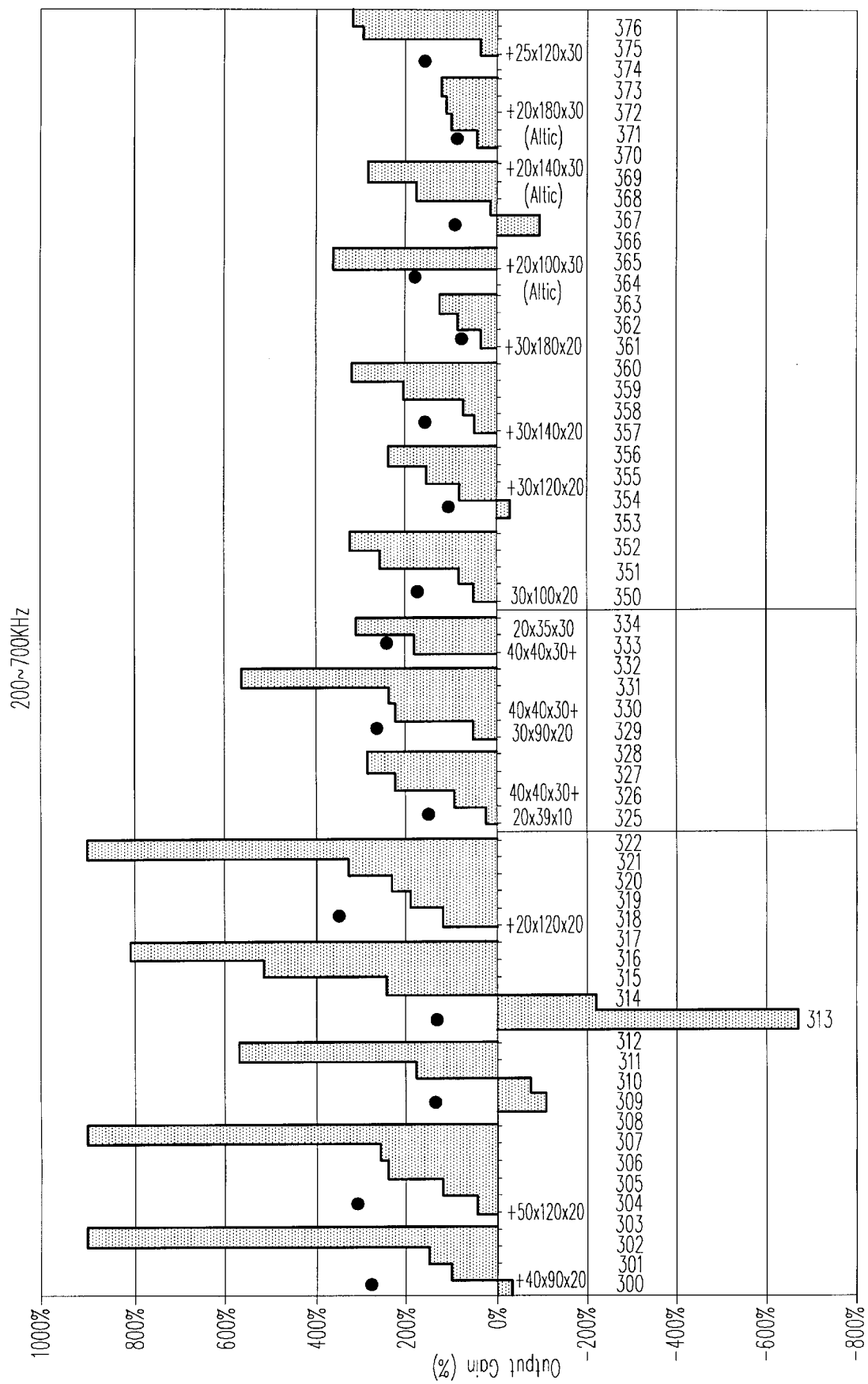
FIG. 12 illustrates the improvement in the gain of an electrical signal caused by mounting a type 1 piezo-electric transducer, a type 2 piezo-electric transducer, and an $Al_2O_3$—TiC beam on a type 2 piezo-electric transducer, which in turn is mounted on a glide head slider. The data of FIG. 11 was obtained by passing an electrical signal from the type 2 transducer through a 200 KHz to 700 KHz electrical filter.

FIG. 12 shows the improvement in the output signal by using our invention. In FIG. 12, the sliders corresponding to glide heads 300 to 322 comprised a type 2 piezo-electrical transducer mounted on a slider, and a type 1 piezo-electrical transducer mounted on the type 2 piezo-electric transducer.

Glide heads 325 to 334 comprised a first type 2 piezo-electric transducer mounted on a second type 2 piezo-electric transducer. The first and second piezo-electric transducers were mounted perpendicular to one another.

Glide heads 350 to 376 comprised a slider, a type 2 piezo-electric transducer mounted on the slider, and a beam of $Al_2O_3$—TiC (the same material as the slider) mounted on the type 2 piezo-electric transducer.

As can be seen in FIG. 12, there was generally an improvement in the output signal produced by the glide head of our invention. (Certain glide heads did not demonstrate an improvement, e.g. glide heads 300, 309, 310, 313, 314, 354, and 366. Other glide heads showed only minimal improvement. We believe they were aberrations.

While the invention has been described with respect to specific embodiments, those skilled in the art will recognize that changes can be made in form and detail without departing from the spirit and scope of the invention. For example, piezo-electric transducers of different sizes, shapes, and materials can be used. The type 2 transducer can be mounted on top of the type 1 transducer, or the type 1 transducer can be mounted on top of the type 2 transducer. The slider on which the transducers are mounted can be different sizes and shapes, and made from different materials.

The structures coupled to the type 2 transducer can have mechanical characteristics (e.g., elasticity and damping constant) tailored to achieve desired vibration characteristics. In one embodiment, the damping constant can be high to damp out vibrations quickly. In other embodiments, a low damping constant is used.

Also, although the invention may be used in conjunction with disk testing apparatus, the invention can also be used in conjunction with other apparatus in which it is desired to enhance the response of a piezo-electric transducer. Accordingly, all such changes come within our invention.

We claim:

1. An apparatus comprising:
   a first structure;
   a piezo-electric transducer coupled to said first structure for providing an electrical signal in response to said first structure receiving a mechanical stimulus; and
   means coupled to said transducer for increasing the effect of said mechanical stimulus on said transducer by applying a force to said transducer in response to said mechanical stimulus.

2. A method comprising:
   sensing a mechanical stimulus applied to a first structure with a piezo-electric transducer coupled to said first structure; and
   enhancing the response of said piezo-electric transducer to said stimulus by causing a second structure mechanically coupled to said transducer to apply a force to said transducer in response to said stimulus.

3. A glide head assembly comprising:
   a slider;
   a first piezo-electric transducer mounted on said slider for providing an electrical signal in response to said slider encountering a defect;
   a block mounted on said first piezo-electric transducer; and
   a suspension arm mounted on said slider.

4. The glide head of claim 3, wherein:
   said first piezo-electric transducer is a type 1 piezo-electric transducer; and
   said block is a type 2 piezo-electric transducer.

5. The glide head of claim 4 wherein said type 1 piezo-electric transducer is not electrically coupled to the type 2 piezo-electric transducer, but is mechanically coupled to the type 2 piezo-electric transducer.

6. The glide head of claim 3, wherein:
   said first piezo-electric transducer is a type 2 piezo-electric transducer; and
   said block is a type 1 piezo-electric transducer.

7. The glide head of claim 6 wherein said type 1 piezo-electric transducer is not electrically coupled to the type 2 piezo-electric transducer, but is mechanically coupled to the type 2 piezo-electric transducer.

8. The glide head of claim 3, wherein:
   said first piezo-electric transducer is a first type 2 piezo-electric transducer;
   said block is a second type 2 piezo-electric transducer, wherein one of said first or second type 2 piezo-electric transducers provides a signal indicative of when said slider strikes an asperity, said second type 2 piezo-electric transducer being mounted in a direction that is perpendicular to the orientation of the first type 2 piezo-electric transducer.

9. The glide head of claim 8 wherein said first and second piezo-electric transducers are not electrically connected to one another.

10. The glide head of claim 3, wherein:
    said first piezo-electric transducer is a type 2 piezo-electric transducer; and
    said block is a beam mounted on said type 2 piezo-electric transducer, said type 2 piezo-electric transducer providing a signal indicative of when said slider strikes an asperity, said type 2 piezo-electric transducer and said beam mechanically interacting to enhance the signal to noise ratio of said type 2 piezo-electric transducer.

11. The glide head of claim 3 wherein said block is $Al_2O_3$—TiC.

12. A method for testing a disk for surface defects, the method comprising:
    rotating the disk;
    flying a glide head in proximity to the disk, the glide head comprising a slider, a first piezo-electric transducer mounted on said slider, a block mounted on said first piezo-electric transducer, and a suspension arm mounted on said slider; and detecting an electrical signal provided by one of the first piezo-electric transducer and the block.

13. The method of claim 12, wherein: said first piezo-electric transducer is a type 1 piezo-electric transducer, and said block is a type 2 piezo-electric transducer; and said electrical signal is provided by the type 2 piezo-electric transducer.

14. The method of claim 13 wherein the type 1 piezo-electric transducer is not electrically connected to the type 2 piezo-electric transducer.

15. The method of claim 12, wherein:

said first piezo-electric transducer is a type 2 piezo-electric transducer, and said block is a type 1 piezo-electric transducer; and said electrical signal is provided by the type 2 piezo-electric transducer.

16. The method of claim 15 wherein the type 1 piezo-electric transducer is not electrically connected to the type 2 piezo-electric transducer.

17. The method of claim 12 wherein:

said first piezo-electric transducer is a first type 2 piezo-electric transducer, and said block is a second type 2 piezo-electric transducer; and said electrical signal is provided by one of the first or second type 2 piezo-electric transducers.

18. The method of claim 17 wherein said first and second type 2 LAW OFFICES OF piezo-electric transducers are not electrically connected to one another.

19. The method of claim 12, wherein:

said first piezo-electric transducer is a type 2 piezo-electric transducer, and said block is a beam; and said electrical signal is provided by said type 2 piezo-electric transducer, said beam cooperating with said piezo-electric transducer to enhance the signal to noise ratio of the signal produced by said piezo-electric transducer.

20. The method of claim 12, wherein:

said first piezo-electric transducer is a type 2 piezo-electric transducer, said block is mechanically coupled to said type 2 piezo-electric transducer; and said electrical signal is provided by said type 2 piezo-electric transducer, said block cooperating with said type 2 piezo-electric transducer to mechanically amplify oscillations of said type 2 piezo-electric transducer and enhance the signal to noise ratio of the signal produced by said type 2 piezo-electric transducer.

* * * * *